United States Patent

Weirich et al.

Patent Number: 5,592,855
Date of Patent: Jan. 14, 1997

[54] TRANSMISSION SHIFT KEY

[75] Inventors: Mike Weirich, Medina; Kurt E. Vogt, Crestline, both of Ohio

[73] Assignee: MTD Products Inc., Cleveland, Ohio

[21] Appl. No.: 587,420

[22] Filed: Jan. 16, 1996

Related U.S. Application Data

[62] Division of Ser. No. 260,763, Jun. 16, 1994.

[51] Int. Cl.$^6$ .......................................... F16H 3/08
[52] U.S. Cl. .................... 74/371; 74/366; 74/372
[58] Field of Search ............... 74/335, 366, 371, 74/372

[56] References Cited

U.S. PATENT DOCUMENTS

| | | | |
|---|---|---|---|
| 4,702,120 | 10/1987 | Okada et al. | 74/371 |
| 4,771,636 | 9/1988 | Fujita | 74/371 |
| 4,779,475 | 10/1988 | Irikura et al. | 74/371 |
| 4,827,783 | 5/1989 | Yamaoka et al. | 74/371 |
| 4,932,278 | 6/1990 | Nemoto | 74/371 |
| 4,966,574 | 10/1990 | von Kaler et al. | 74/371 X |
| 5,063,794 | 11/1991 | von Kaler | 74/371 |
| 5,109,722 | 5/1992 | Hufnagle et al. | 74/371 |
| 5,183,138 | 2/1993 | Jolliff | 74/371 X |
| 5,211,067 | 5/1993 | von Kaler | 74/371 |

Primary Examiner—Vinh T. Luong
Assistant Examiner—Peter Kwon
Attorney, Agent, or Firm—Lightbody Law Office

[57] ABSTRACT

A shift key mechanism using a lateral pivot riding on milled ridges on the outer surface of a shift shaft in order to index a spring biased shift key to a gear location.

13 Claims, 6 Drawing Sheets

TRANSMISSION SHIFT KEY

This is a divisional of copending application(s) Ser. No. 08/260,763 filed on Jun. 16, 1994.

FIELD OF THE INVENTION

This invention relates to the use of indexing ridges on the outer surface of a rotating shaft to locate a longitudinal sliding spring loaded shift key in operational positions.

BACKGROUND OF THE INVENTION

Longitudinal sliding shift keys have been long used to selectively interconnect-individual gears to a rotating shaft so as to alter the operative condition of a transmission. Typically, there is at least one longitudinal slot cut into the outer surface of the rotating shaft, with the shift key located therein. The gears surrounding the rotating shaft are freely journalled thereon. As the shift key is longitudinally moved in the slot, normally by a shift collar (itself interconnected to a shift lever), a tab on one end of, the shift key interengages notches on the inner circumference of the individual gears thus connecting such gear to the shaft for rotation therewith. In recent units, the tab on the shift key is retractable with a spring loading bias outwards. This spring loading allows the shift key to be moved prior to the alignment of the tab with the interengaging notch in the gear. The spring loading type devices are customarily accompanied by some sort of indexing device., which device provides a positive stop for the shift key in locations corresponding to aligning the tab with the gears. This facilitates the functioning of the shift mechanism. Examples of shift key mechanisms include VonKaler Reexam 32,125, Toro U.S. Pat. No. 5,109,722, Italian Patent 475,179 and Japanese Patent 62-288750.

OBJECTS AND SUMMARY OF THE INVENTION

It is an object of the present invention to provide for an efficient shift key mechanism.

It is another object of the present invention to improve the tactile feel of shift mechanisms.

It is yet another object of the present invention to lower the friction in shift key mechanisms.

It is still another object of the present invention to lower the cost of shift mechanisms.

It is yet a further object of the present invention to simplify the manufacturing of transmissions including shift key mechanisms.

Other objects and a more complete understanding of the invention may be had by referring to the following description and drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

Figure 1:
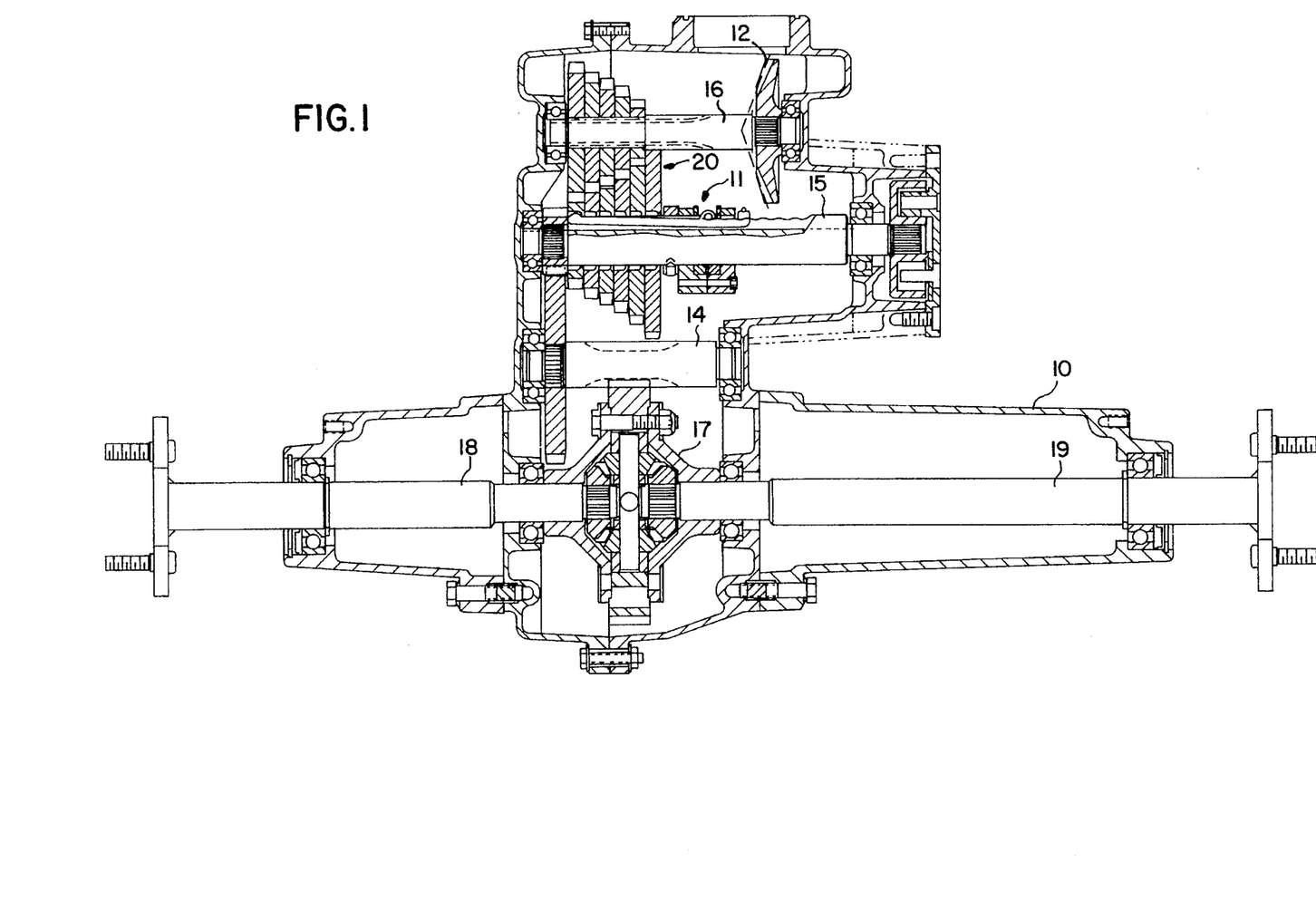
FIG. 1 is a layout view of a six speed transmission incorporating the improved shift key mechanism of the application taken substantially along lines 1—1 in FIG. 8.

This invention relates to a shift key mechanism 11 for use with transmissions. The mechanism 11 will be described in the atmosphere of a six speed transmission 10 having at least two parallel shafts 15, 16 with meshing gears 20 (FIG. 1).

The two parallel shafts 15, 16 interconnect the transmission 10 to a source of input power and a drive output. It does not make any difference for this invention which shaft 15, 16 is utilized for either. In the embodiment shown, the gear shaft 16 is utilized for power input from an engine through a mechanical clutch (not shown) providing forward and reverse shifting under power to the input bevel gear 12 on the gear shaft 16. This mechanical clutch is described in U.S. Ser. No. 039,630 filed Mar. 30, 1992, incorporated herein by reference. Other methods of connecting the shaft 16 (or 15) to power could also be utilized. The Sunstrand 10 BDU hydrostatic power unit is an example of alternate means of connecting the shaft 16 of the disclosed embodiment to power.

The second shaft, 15 in the example, is interconnected to a power output. The particular power output shown is a reduction shaft 14 driven differential 17 interconnected to two axle half shafts 18, 19. Wheels (not shown) are mounted to the ends of these axle half shafts 18, 19 in the customary manner. Again, other methods of power output could be utilized.

The meshing gears 20 drivingly interconnect the two shafts 15, 16 in a manner later described. The number, location, and/or type of gears are not critical to the invention as long as there is at least one freely journalled about the one shaft, shift shaft 15 shown, and its mate somehow drivingly interconnected to the other shaft, 16 shown. Although the gears 20 shown are conventional immediately sequential toothed bull gears, six in number 21–26, that all counter rotate, other types of driving interconnections including belts, chains, idler reverse gears, and other types could also be utilized with the invention.

Figure 2:
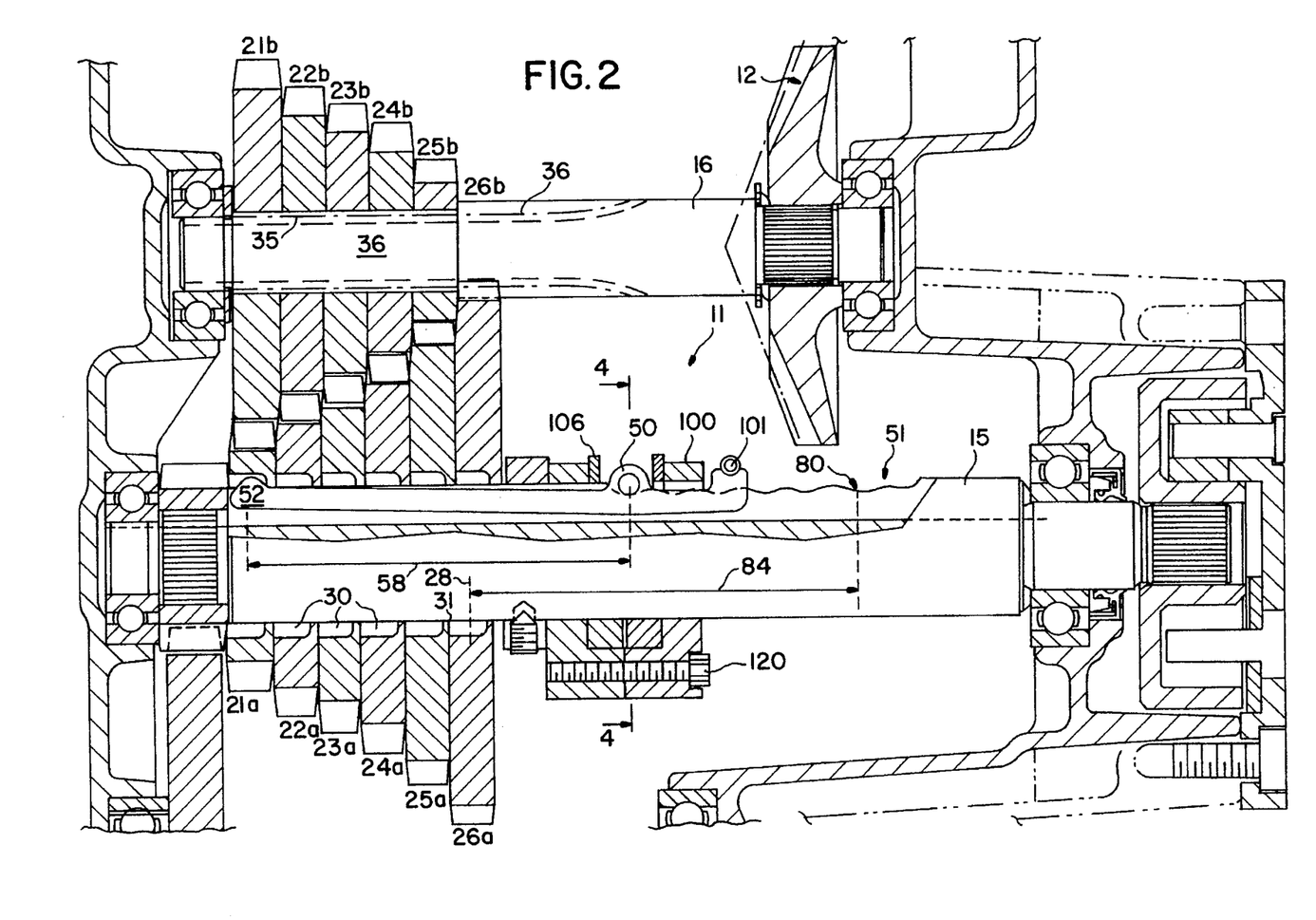
FIG. 2 is an enlarged sectional view of the shift shaft and parallel gear shaft of the transmission of FIG. 1.

The first set of gears 21a–26a are made of powder metal and journalled about the shift shaft 15 for free rotation in respect thereto (FIG. 2). On the inside diameter of each of these gears 21a–26a, there are a series of notches 30 formed therein. The number of these notches 30 for each gear are not important as long as there is at least one. However, more than this number is preferred so as to not unduly delay activation of the shift key engagements with any respective gear. In the preferred embodiment shown, these notches 30 are six in number. This allows an acceptable engagement time while also not compromising gear strength. Although not absolutely necessary due to the later described indexing mechanism, the notches 30 could be closed or interrupted between adjoining gears 20 so as to hold the shift key in a position of non-engagement with any gear if two adjoining gears could both be engaged by the shift key. Examples of this would be to extend one end of the notch all the way to the outside diameter of the shift shaft 15 by an integral wall 31 as shown or using a separate intervening washer. An integral wall 31 is preferred because this also helps physically support the gears 20 to the shaft 15 and eases manufacture.

A second set of gears 21b–26b is drivingly connected to the other shaft 16. In the preferred embodiment disclosed, this is accomplished by a series of meshing splines 35 on the inside diameter of the powder metal 25 gears 21b–26b and complementary splines 36 on the outside diameter of the other shaft 16. The gear 26b is the splines 36. This reduces the cost of the transmission as well as increasing the strength of this gear 26b for a given diameter. Other methods of driving interconnection could also be used for the gears including notches in the gears 21b–26b and inset keys in the shaft 16. Integral gears 21b–26b and shaft 16, woodruf keys, etc. could also be utilized.

Figure 3:
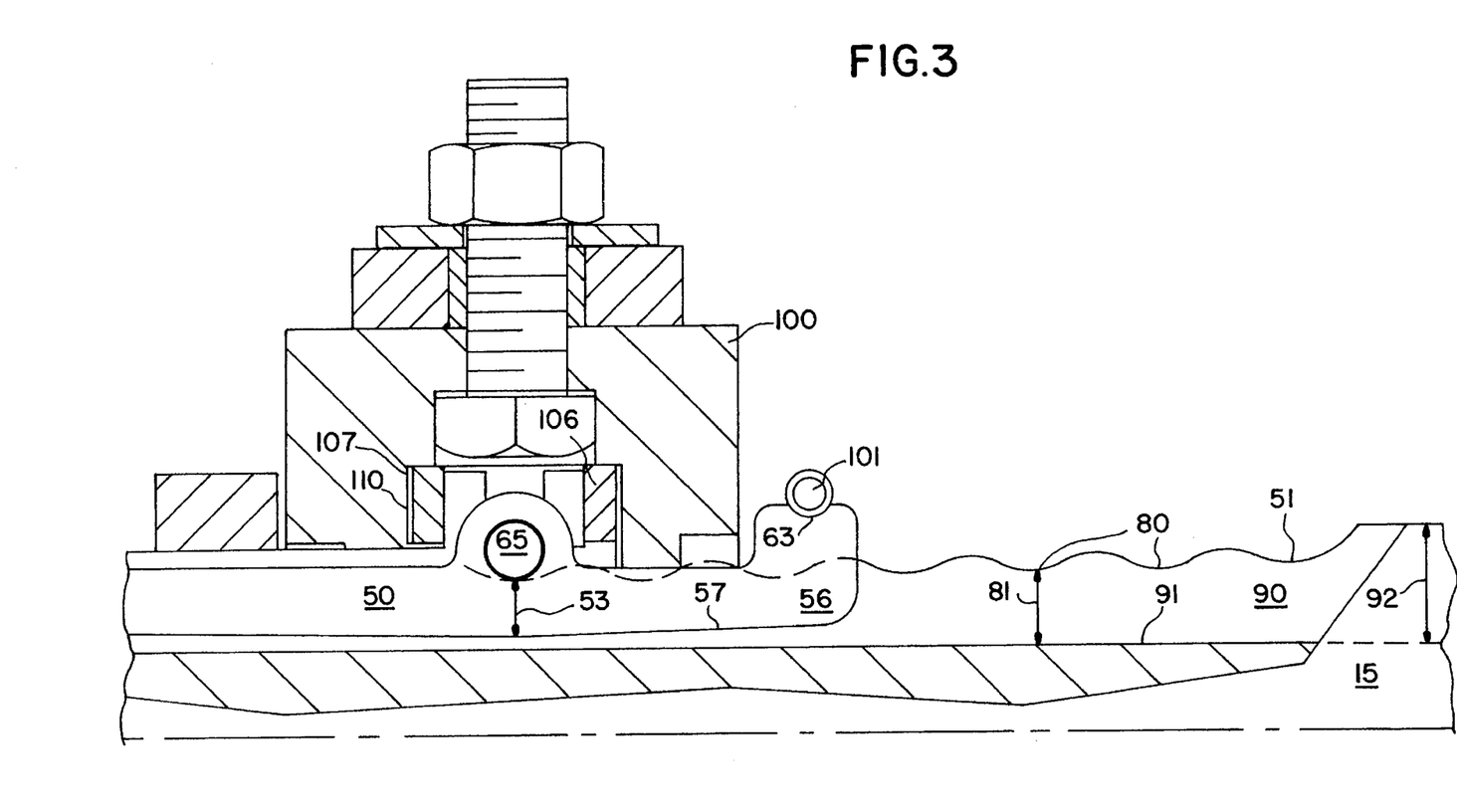
FIG. 3 is a further enlarged longitudinal cross sectional view of the rotary shift shaft including the shift key mechanism incorporating the invention of the application taken substantially along lines 3—3 in FIG. 4.
Figure 4:
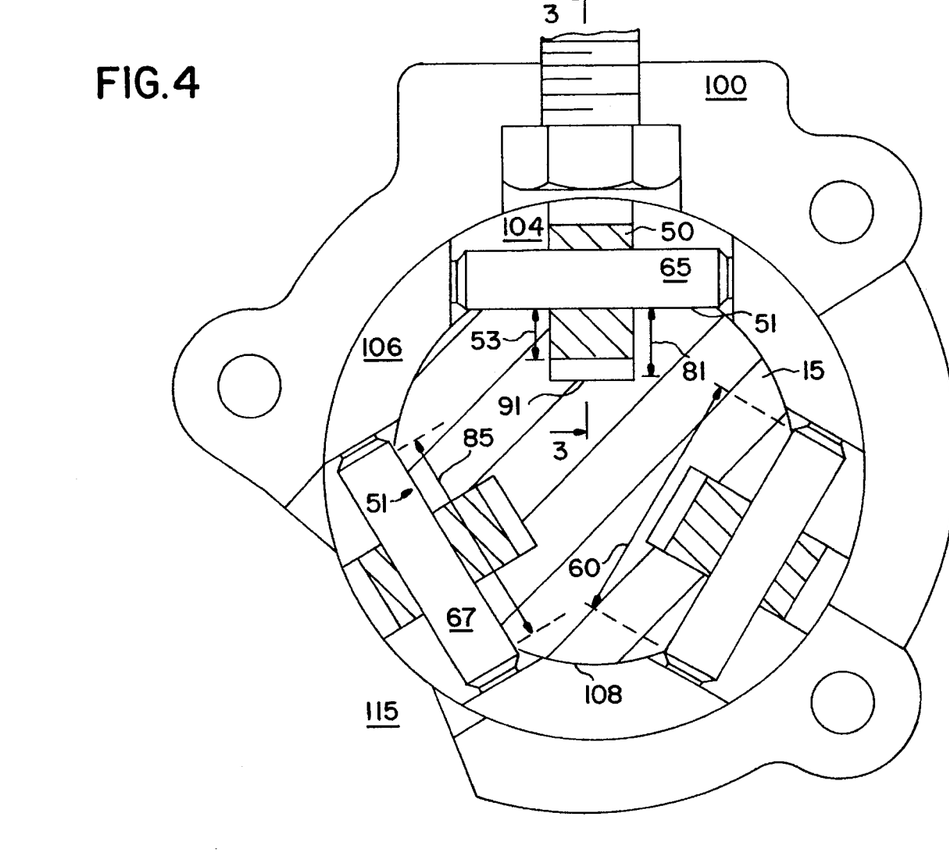
FIG. 4 is an enlarged lateral cross sectional view of the shift pivot area taken substantially along lines 4—4 in FIG. 2.

The invention of the present application relates to the shift key mechanism 11 utilized to selectively drivingly interconnect the shift shaft 15 to the gears 21a–26a journalled thereon (FIGS. 3, 4).

In conventional shift key mechanisms, typically the shift keys are slidingly located in a series of longitudinal grooves milled into a shift shaft supported by the bottoms of the grooves. Examples previously set forth even go so far as to use bumps on the bottoms of the milled grooves for indexing as in Toro U.S. Pat. No. 5,109,722.

In the preferred embodiment of the present invention, the shift key 50 is effectively suspended from the outer diameter 51 of the shaft 15 by a pivot 65, which pivot 65 also acts in concert with ridges or grooves 80 milled into such outer diameter to index the shift key 50. The preferred pivot 65 also interconnects the surrounding shift collar 100 to the shift key 50 for movement therewith. The preferred pivot 65 in addition cooperates with a spring 101 at the non-gear engaging end of the shift key 50 to spring bias the gear engaging tab 52 into engagement with the notches 30 in the gears 21a–26a.

In respect to the effective suspension of the shift key 50 by the pivot 65, the preferred pivot 65 is a pin located perpendicular to the longitudinal axis of the key 50 (FIG. 3). The shift key 50 has a dimension 53 beneath the pivot 65 less than the minimum distance 81 between a seating groove 80 and the bottom 91 of the longitudinal slot 90 in the shift shaft 15. The maximum height of the gear engaging tab 52 is less than the depth 92 of the longitudinal slot 90 to the full outside diameter of the shift shaft 15 (i.e., so as to allow the tab 52 to be freely moved and also to allow the gears 21–26 to rotate about the shaft 15 when the tab 52 is not engaged). At the opposite end 56 of the shift key 50, there is an angled cutaway 57 that allows the angled shifting of the gear engaging tab 52 upwards and downwards into the notches 30 of the gears 21a–26a (preferably full depth) without interference. With these qualities, the shift key 50 is physically suspended to the outer surface of the shaft 15 at the seating grooves 80 by the pivot 65 without interfering contact to the bottom 91 of the groove 90.

In respect to the pivot 65 cooperating with the grooves 80 to index the key 50, there are a series of grooves 80 located, milled, or otherwise formed on the outside surface of the shaft 15. These grooves 80 are located on such shaft 15 spaced from the engagement center 28 of each respective one of the gears 21a–26a by a distance 84 equal to the longitudinal distance 58 of the key 50 between the pivot 65 and the gear engaging tab 52 (FIG. 2). Preferably the number of grooves is at least equal to the number of gears 20, thus insuring one index position for the pivot 65 for each gear 20. With these qualities, the operator is provided with a tactile feedback for each gear since the pivot 65 will bottom in a groove 80 when the tab 52 is aligned with the engagement center 28 of each notch 30 of a gear 21a–26a. The grooves 80 shown are spaced from each other by the spacing of the gears 21a–26a.

In respect to the use of the pivot 65 to interconnect the shift collar 100 to the shift key 50, the ends 67 of the pivot 65 that extend outside of the outside diameter 51 of the shift shaft 15 when the pivot 65 is bottomed in a groove 80 are available for shift collar 100 access (FIG. 4). The longitudinal length 60 of the pivot 65 is preferably effectively longer than the distance 85 laterally across the grooves 80. This causes the full diameter of the ends 67 of the pivot 65 to be available for the interconnection to the shift collar 100 thus strengthening this connection while also more fully compensating for upwards/downwards motion of the pivots 65.

The actual interconnection between the pivots 65 and shift collar 100 must pass longitudinal movement between the collar 100 and the keys 50 (thus allowing gear selection) while also allowing the keys 50 and the shaft 15 to rotate (thus allowing power transfer). To accomplish this, two circular bushings 106 are located between the pivots 65 and the shift collar 100. These bushings 106 are mirror image cylindrical members having a central hole 108 and surrounding indented slots 101. The central hole 108 of the bushings 106 have an inner diameter substantially matching the outer diameter of the shaft 15 while the slots 101 have a length substantially matching the longitudinal length 85 of the pivots 65. These bushings 106 are located on either side of the pivots 65 with flat circular surfaces 107 abutting flat circular cavities 110 in the shift collar 100. Bolts 120 hold the assembly together. The bushings 106 (and thus the pivots 65 and shaft 15) can rotate within the assembly in respect to the non-rotating shift collar while also transferring longitudinal movement of the assembly to the pivots 65. Since slots 104 in the bushing 106 capture the ends 67 of the pivots 65 between two surfaces, this allows the pivots 65 to ride up and down the grooves 80 while also passing any movement of the shift collar 100 in a longitudinal direction in respect to the shaft 15 to the shift key 50. This allows the selective movement of the shift keys 50 by the shift collar 100. Note that the shift collar 100 is asymmetrical due to a cutaway 115 in part thereof (FIG. 4). This cutaway 115 allows clearance for the bevel input gear 12, an otherwise interfering part (see FIG. 1). This reduces the size of the transmission.

In respect to the spring loading of the gear engaging tabs 52, in the embodiment shown a spiral spring 101 extends over the opposite ends 56 of the shift keys 50 (and also 360° about the shift shaft 15). Grooves 63 retain the spring 101 into position in respect to the shift keys 50. This spring 101 cooperates with the pivot 65 to bias the gear engaging tabs 52 radially outwards of the shift shaft 15, thus causing these tabs 52 to move into the notches 30 in the gears 20 upon alignment therewith.

Note that the gear engaging tab 52, the pivot 65, and the spring force 101 are substantially equally spaced from the longitudinal axis of the shift shaft 15. With this orientation, the transfer of forces between the shift collar 100 and the shift key 50 is substantially in line and thus is very efficient. It also provides a quality feel for the shift mechanism.

Figure 5:
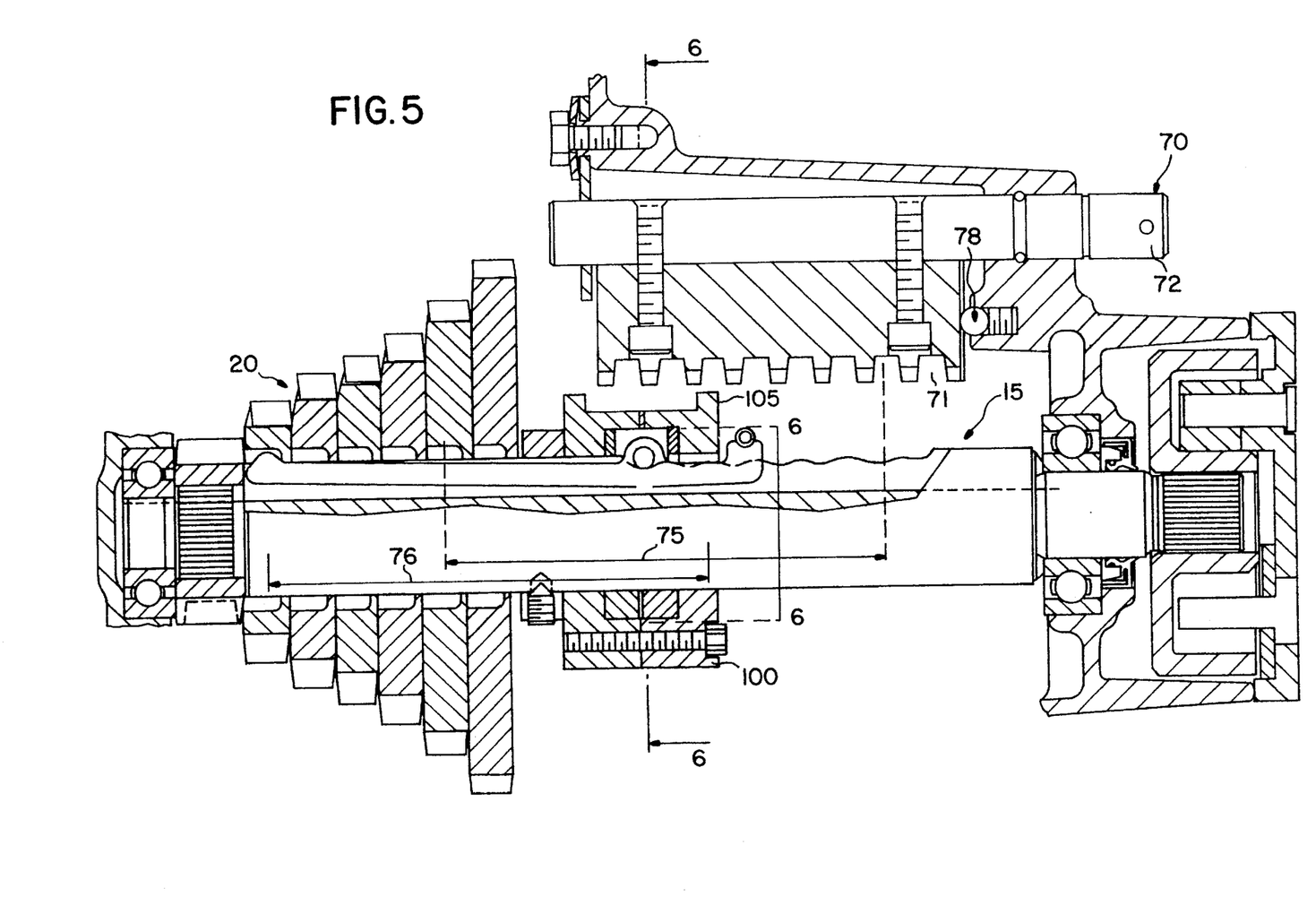
FIG. 5 is an enlarged sectional view of the shift shaft and parallel shift lock shaft taken substantially along lines 5—5 in FIG. 8.
Figure 6:
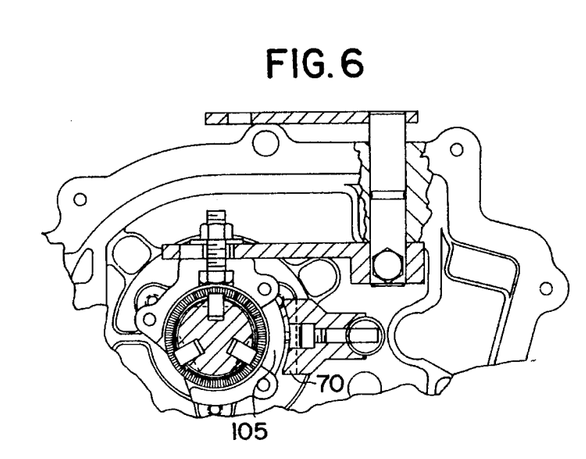
FIG. 6 is a lateral cross sectional view of the rotary shift shaft including the shift key mechanism taken generally along lines 6—6 of FIG. 5 (the shift lock is shown disengaged)
Figure 7:
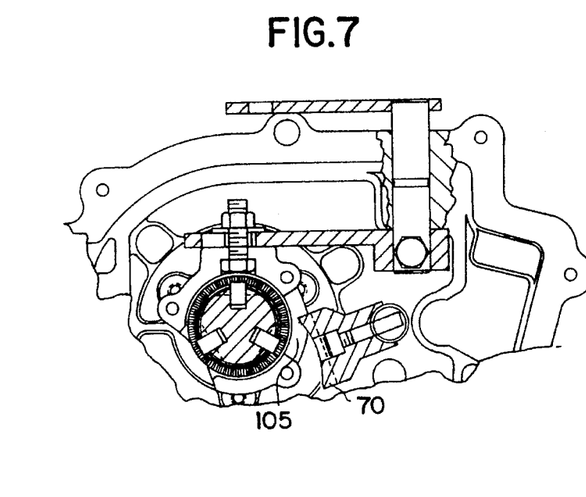
FIG. 7 is a view like FIG. 6 with the shift lock engaged.
Figure 8:
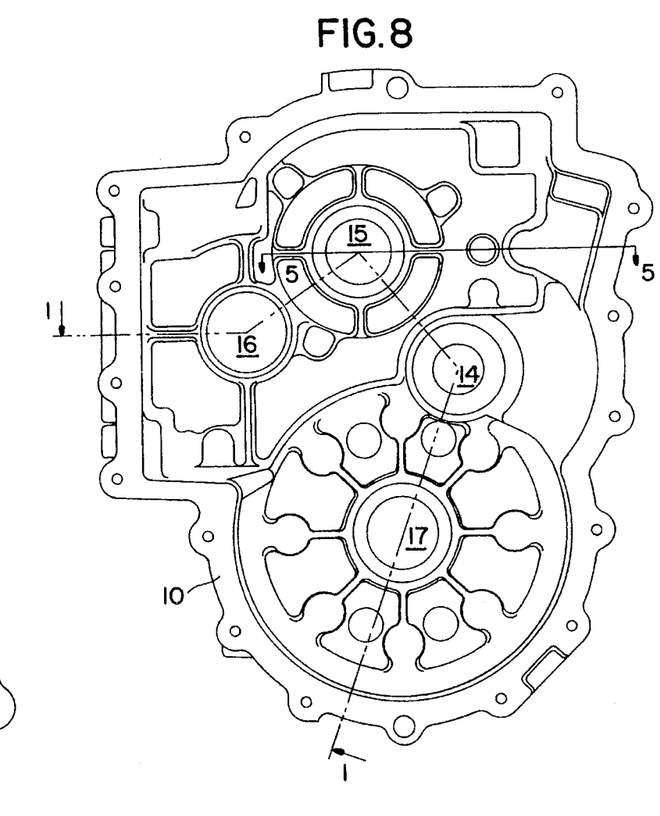
FIG. 8 is a side view of a transmission casing locating the various shafts for the transmission.

The operative positioning of the shift key 50 is verified by a rotary shift lock 70 (FIGS. 5–7). This shift lock 70 has a series of adjacent slots 71, which slots are spaced by a distance 75 from each respective gear 21a–26b notch by the length 58 of the key 50. This distance 75 is itself equal to the distance 76 between the gear engaging tab 52 and the semi-circular tab 105 (furthest tab utilized in the embodiment shown). With altering embodiments, the markers for the measurements of these distances will vary from that shown. The slots 71 thus correspond to the engaged position for each gear 20. The slots 71 are located along the longitudinal length of the shift lock 70 spaced from each other by a distance equal to the distance between the centers 28 of neighboring gears 20. These slots 71 cooperate with a pair of semi-circular tabs 105 on the neighboring shift collar 100 as later described to retain the shift collar 100 into its operator set position. To speed and strengthen the engagement of the slots 71 with the tabs 105, the outer edges of the slots 71 are closely spaced to the tabs 105 (FIG. 6). Thus, only a minimal rotation of the shift lock 70 is necessary to engage the slots 71 with the tabs 105, with further rotation engaging the slots 71 almost full depth. This is preferred. The rotation of the shift lock 70 is occasioned by a lever and a "W" spring wire which is interconnected to the clutch mechanism (not shown) so as to interconnect same for common movement. With this interconnection, upon movement of the clutch mechanism into drive, the shift lock 70 rotates in order to interengage the slots 71 with the tabs 105 of the shift collar. Upon the clutch mechanism being returned to neutral, the shift lock rotates to disengage the slots 71 with the tabs 105.

The shift lock 70 itself has two positions. In the first position, shown in FIG. 6, the shift lock 70 is disengaged from the tabs 105 of the shift collar 100. This allows the shift collar 100 to be moved longitudinally of the shift shaft 15 without any hindrance. This occurs when the clutch mechanism is in neutral. Upon the positioning of the shift collar 100 in an operative position, due to the interaction between the pivot 65 of the shift key 50 and the grooves 80 on the outer diameter of the shift shaft 15, the slots 71 are also aligned with the tabs 105 of the shift collar 100. The shift lock 70 is then able to rotate about its shaft 72 in order that the slots 71 might interengage the extending tabs 105 on the shift collar 100, thus holding the shift collar 100 (and the shift key 50) into a precisely located position; this even if the operator tries to manually manipulate the shift collar 100 without disengaging the clutch. This occurs when the clutch mechanism is out of its neutral position. This locks the shift collar into a precise operative condition as long as the clutch is engaged. This operative condition may be neutral, reverse, or any of the forward speeds of other operative conditions of the transmission. To compensate for any slight dimensional tolerances and/or slight misalignment of slot 70 to tab 105, a spring loaded ball slack adjuster 78 is included off of one end of the shift lock 70. This allows the shift lock 70 to slightly float without compromising its locking function. In addition, the slack adjuster 78 dedents with slight pockets in the end of the shift lock 70 to retain the shift lock 70 in its selected position.

Although the invention has been described in its preferred embodiment with a certain degree of particularity, it is to be understood that numerous changes can be made without deviating from the invention as hereinafter claimed.

What is claimed:

1. An improved shift key mechanism for a transmission having a rotating shaft with at least one gear freely journalled thereon, the shaft having at least one longitudinal slot in its circumferential outer surface, a shift key being in the slot slideable therein for selectively connecting an individual gear to the shaft and the shift key being longitudinally movable in the slot by a shift collar, the improvement of a pivot, said pivot being connected to the shift key, said pivot engaging the outer circumferential surface of the shaft to support the shift key above the bottom of the slot, at least one tab, said tab being on the shift collar, a shift lock, said shift lock having at least one slot, said shift lock being movably connected to the transmission, and means to selectably engage said slot of said shift lock with said tab on the shift collar so as to cooperate to maintain the transmission in an operator-set position.

2. The improved shift key mechanism of claim 1 characterized by the addition of means to adjust slack so as to compensate for the tolerances which might be present in the transmission.

3. The improved shift key mechanism of claim 1 characterized by the addition of a series of indexing ridges, said indexing ridges being formed in the outer circumferential surface of the shaft generally parallel to the longitudinal slot, a dedent means to dedent the shift key to the series of indexing ridges, said indexing ridges being spaced by a certain longitudinal distance, a multiplicity of slots, said slots corresponding to the engaged positioning of the gears respectively, said indexing ridges being spaced by a distance substantially equal to the engagement centers of said gears respectively, and said multiplicity of slots selectably engaging said tab on the shift collar to maintain said shift collar in the operator-set position.

4. The improved shift key mechanism of claim 3 characterized in that said indexing ridges are formed in the outer surface of the shaft immediately adjacent to the slot and said dedent means includes said pivot engaging said indexing ridges.

5. An improved shift key interlock mechanism for a transmission having a rotating shaft with at least one gear freely journalled thereon, the shaft having at least one longitudinal slot in its circumferential outer surface, a shift key being in the slot slidable therein for selectably interconnecting at least one individual gear to the shaft and the shift key being longitudinally movable in the slot by a shift collar, the improvement of a tab, said tab being interconnected to said shift collar, a shift lock mechanism, said shift lock mechanism being moveably mounted to the transmission located next to the shift collar, and means for said shift lock mechanism to selectably interengage said tab on the shift collar so as to maintain the transmission in an operator-set position.

6. The improved shift key interlock mechanism of claim 5 wherein the transmission includes a multiplicity of gears and characterized in that said means for said shift lock mechanism to selectably interengage said tab on the shift collar includes a plurality of adjacent slots, with each of said adjacent slots corresponding to the engaged positioning of one of the multiplicity of gears respectively.

7. The improved shift key interlock mechanism of claim 5 characterized in that said shift lock mechanism includes a rotary shift lock shaft, and said rotary shift lock shaft being substantially parallel to the rotating shaft of the transmission.

8. The improved shift key interlock mechanism of claim 7 wherein the transmission includes a clutch and characterized by the addition of means to engage said shift lock mechanism with said tab when the clutch is moved out of neutral.

9. An improved shift key interlock mechanism for a transmission having a rotating shaft with at least one gear freely journalled thereon, the shaft having at least one longitudinal slot in its circumferential outer surface, a shift key being in the slot slidable therein for selectably interconnecting at least one individual gear to the shaft and the shift key being longitudinally movable in the slot by a shift collar, the improvement of a tab, said tab being interconnected to said shift collar, a rotary shift lock, means to rotatively connect said rotary shift lock to the transmission, and means for said rotary shift lock to selectably interengage said tab on the shift collar so as to maintain the transmission in an operator-set position.

10. The improved shift key interlock mechanism of claim 9 characterized by the addition of means to adjust slack so as to compensate for the tolerances which might be present in the transmission.

11. The improved shift key interlock mechanism of claim 9 characterized by the addition of a series of indexing ridges, said indexing ridges being formed in the outer circumferential surface of the shaft generally parallel to the longitudinal slot, a dedent means to dedent the shift key to the series of indexing ridges, said indexing ridges being spaced by a certain longitudinal distance, a multiplicity of slots, each of said slots corresponding to the engaged positioning of one of the gears respectively, said indexing ridges being spaced by a distance substantially equal to the engagement center of said gears respectively, and means for said multiplicity of slots to selectably engage said tab on the shift collar to maintain said shift collar in the operator-set position.

12. The improved shift key interlock mechanism of claim 11 characterized in that said indexing ridges are formed on the outer surface of the shaft immediately adjacent to the slot and characterized by the addition of a pivot for the shift key and said dedent means includes said pivot engaging said indexing ridges.

13. The improved shift key interlock mechanism of claim 12 characterized in that said slots of said shift lock mechanism have outer edges and said outer edges being closely spaced to said tab.

* * * * *